(12) United States Patent
Engel et al.

(10) Patent No.: US 12,632,976 B2
(45) Date of Patent: May 19, 2026

(54) METHOD FOR DIGITALLY STAINING CELLS

(71) Applicant: Siemens Healthcare Diagnostics Inc., Tarrytown, NY (US)

(72) Inventors: Thomas Engel, Aalen (DE); Gaby Marquardt, Hausen (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 342 days.

(21) Appl. No.: 17/779,546

(22) PCT Filed: Nov. 5, 2020

(86) PCT No.: PCT/IB2020/060401
§ 371 (c)(1),
(2) Date: May 24, 2022

(87) PCT Pub. No.: WO2021/105801
PCT Pub. Date: Jun. 3, 2021

(65) Prior Publication Data
US 2023/0062698 A1     Mar. 2, 2023

(30) Foreign Application Priority Data

Nov. 26, 2019     (EP) .................................... 19211472

(51) Int. Cl.
*G06T 7/571*          (2017.01)
*G06T 7/557*          (2017.01)
(Continued)

(52) U.S. Cl.
CPC .............. *G06T 7/571* (2017.01); *G06T 7/557* (2017.01); *G06T 15/08* (2013.01); *G06T 19/20* (2013.01);
(Continued)

(58) Field of Classification Search
CPC ......... G06T 7/557; G06T 7/571; G06T 11/00; G06T 15/08; G06T 19/20;
(Continued)

(56) References Cited

U.S. PATENT DOCUMENTS

| | | | |
|---|---|---|---|
| 8,660,312 B2 * | 2/2014 | Cui ........................ | G02B 21/18 382/106 |
| 9,041,792 B2 * | 5/2015 | Van Leeuwen ........ | A63B 43/02 382/128 |

(Continued)

FOREIGN PATENT DOCUMENTS

| | | |
|---|---|---|
| WO | WO2007044725 A2 | 4/2007 |
| WO | WO2010121637 A1 | 10/2010 |
| WO | WO2019032723 A1 | 2/2019 |

OTHER PUBLICATIONS

Anonymous: "Staining—Wikipedia", Oct. 25, 2019, XP055693148, Found on Internet: URL:https://en.wikipedia.org/w/index.php? title= Staining&oldid=922929495 [found on May 8, 2020].
(Continued)

*Primary Examiner* — Katrina R Fujita
(74) *Attorney, Agent, or Firm* — Dugan & Dugan, PC

(57) ABSTRACT

A method for digitally staining a cell and/or a medical preparation cell comprises: determining three-dimensional information of a cell and/or of a medical preparation using an analyzer for analyzing a medical sample, the analyzer comprising an apparatus for determining the three-dimensional information of the cell and/or of the medical preparation; digitally staining the cell and/or the medical preparation according to a predetermined correlation between the three-dimensional information of the cell and/or of the medical preparation and the staining of a corresponding cell and/or medical preparation and/or cellular and/or sub-cellular structures of the cell and/or of the medical preparation using a staining protocol; representing the digitally stained
(Continued)

cell and/or the preparation, the representation involving a predetermined defocus region, and regions of the cell and/or of the preparation being represented by different digital staining in the area of the defocus region as corresponding modulations of color intensities and/or as mixed color.

21 Claims, 1 Drawing Sheet

(51) Int. Cl.

| | |
|---|---|
| *G06T 15/08* | (2011.01) |
| *G06T 19/20* | (2011.01) |
| *G06V 20/64* | (2022.01) |
| *G06V 20/69* | (2022.01) |
| *H04N 23/90* | (2023.01) |

(52) U.S. Cl.
CPC ............ *G06V 20/64* (2022.01); *G06V 20/695* (2022.01); *G06V 20/698* (2022.01); *H04N 23/90* (2023.01); *G06T 2207/10052* (2013.01); *G06T 2207/10056* (2013.01); *G06T 2207/20081* (2013.01); *G06T 2207/30024* (2013.01); *G06T 2219/2012* (2013.01)

(58) Field of Classification Search
CPC . G06T 2207/10052; G06T 2207/10056; G06T 2207/20081; G06T 2207/30024; G06T 2219/2012; H04N 23/90
See application file for complete search history.

(56) References Cited

U.S. PATENT DOCUMENTS

| | | | | |
|---|---|---|---|---|
| 10,614,287 | B2 * | 4/2020 | El-Zehiry | ............ G03H 1/0866 |
| 10,754,140 | B2 * | 8/2020 | Chan | ....................... G02B 21/02 |
| 2007/0252074 | A1 * | 11/2007 | Ng | ........................ H04N 25/611 |
| | | | | 348/E5.045 |
| 2008/0266655 | A1 * | 10/2008 | Levoy | ................ G02B 27/0075 |
| | | | | 359/368 |
| 2010/0128988 | A1 * | 5/2010 | Kincaid | ............... G06V 10/945 |
| | | | | 382/199 |
| 2010/0177942 | A1 * | 7/2010 | Kolatt | ................... G06T 7/0012 |
| | | | | 382/128 |
| 2012/0147002 | A1 * | 6/2012 | Young | .................. G06V 20/695 |
| | | | | 345/594 |
| 2012/0287244 | A1 * | 11/2012 | Bennett | .................. G02B 21/16 |
| | | | | 348/46 |
| 2014/0348410 | A1 * | 11/2014 | Grunkin | ................ G06T 7/0012 |
| | | | | 382/133 |
| 2017/0089837 | A1 * | 3/2017 | Matsumoto | ............ G01B 9/021 |
| 2018/0203217 | A1 * | 7/2018 | Knebel | ............... G02B 21/006 |
| 2018/0239951 | A1 | 8/2018 | El-Zehiry | |
| 2019/0180420 | A1 * | 6/2019 | Gutiérrez Medina | .... G06T 5/73 |
| 2019/0293915 | A1 * | 9/2019 | McCluskey | ........ G02B 27/0972 |
| 2019/0384047 | A1 * | 12/2019 | Johnson | ................. G06N 3/045 |
| 2021/0043331 | A1 * | 2/2021 | Ozcan | ................... G06V 10/764 |
| 2021/0158521 | A1 * | 5/2021 | Shaked | ................. G06T 7/0012 |
| 2021/0364686 | A1 * | 11/2021 | Lim | ................... G02B 27/4205 |

OTHER PUBLICATIONS

Javidi, B. et al.: "Three-dimensional identification of biological microorganism using integral imaging"; optics express; Bd. 14 Nr. 25; pp. 12096-566, XP055522974; DOI:10.1364/OE.14.012096; 2006.

Kim, D. et al.: "Refractive index as an intrinsic imaging contrast for 3-D label-free live cell imaging", bioRxiv, Feb. 6, 2017, XP055692544, 001 : 10.1101/106328 Found on Internet: URL:https://www.biorxiv.org/content/10.1101/106328v1 .full.pdf.

Kim, J. et al.: "A single-shot 2D/3D simultaneous imaging microscope based on light field microscopy"; Visual Communications and Image Processing; Jan. 20, 2004-Jan. 20, 2004; San Jose; Bd. 9655, p. 965510-965510; XP060056316; DOI: 10.1117/12.2185253; ISBN: 978-1-62841-730-2.

Nygate, Y. et al.: "HoloStain: Holographie virtual staining of individual biological cells", arxiv.org, Cornell University Library, 201 Olin Library Cornell University Ithaca, NY 14853, Sep. 25, 2019, XP081481564.

Rivenson, Y. et al.: "PhaseStain: Digital staining of label-free quantitative phase microscopy images using deep learning", arxiv. org, Cornell University Library, 201 Olin Library Cornell University Ithaca, NY 14853, Jul. 20, 2018 ,XP081114622, DOI: 10.1038/ S41377-019-0129-Y.

* cited by examiner

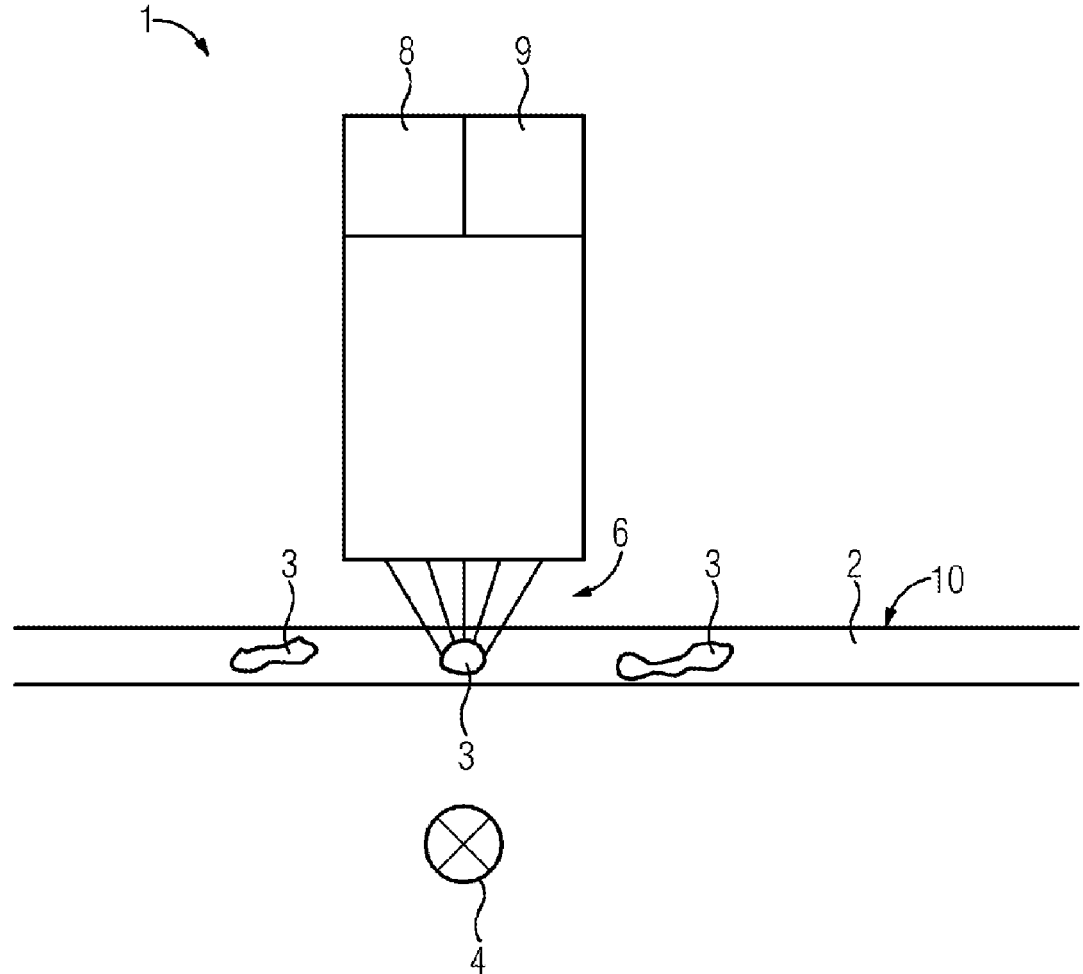

METHOD FOR DIGITALLY STAINING CELLS

CROSS REFERENCE TO RELATED APPLICATIONS

This is a 371 of PCT/IB2020/060401, filed Nov. 5, 2020, which claims priority to European Patent Application No. EP 19211472.6, filed Nov. 26, 2019, both of which are hereby incorporated by reference herein in their entireties for all purposes.

FIELD

The invention is situated in the field of automated analyzers and relates to a method for digitally staining a cell for a hematology analyzer for analyzing cells in a sample.

BACKGROUND

Devices referred to as "automated cell counters" are being employed with increasing success for the automated analysis of cells. Examples of such devices are the Advia 2120, Sysmex XE-2100, CellaVision DM96, and CellaVision DM1200. Apart from their high throughput, these automated devices provide a number of advantages, examples being high objectivity (no variability depending on the observer), elimination of statistical variations typically associated with manual counting (counting of large numbers of cells), and the determination of numerous parameters which would not be available in a manual count, and, as mentioned, a more efficient and cost-effective operation. Some of these devices are able to work through 120 to 150 patient samples per hour.

The technical principles underlying automated single-cell counting are mostly based either on impedance (resistance) measurement or on an optical system (scattered light or absorption measurement). There are also imaging systems established which carry out automated imaging and evaluation of cells in a blood smear, for example.

In the case of the impedance method, the cells are counted and their sizes determined on the basis of the detection and measurement of changes in the electrical conductivity (resistance) caused by a particle moving through a small opening. Particles, such as blood cells for example, are not themselves conducting, but are suspended in an electrically conducting diluent. When such a suspension of cells is passed through an opening, the passage of a single, individual cell is accompanied by a fleeting increase in the impedance (resistance) of the electrical path between the two electrodes located on each side of the opening.

In contrast to the impedance method, the optical method entails the passing of a laser light beam or an LED light beam through a diluted blood sample which is captured by the laser beam or the LED light beam in a continuous flow. The light beam in question here may be passed to the flow cell by means of an optical waveguide, for example. Every cell passing through the capture zone of the flow cell causes the focused light to scatter. The scattered light is then detected by a photodetector and converted into an electrical pulse. The number of pulses generated here is directly proportional to the number of cells passing through the capture zone within a specific timespan.

With the optical methods, the light scattering of the individual cell passing through the capture zone is measured at different angles. As a result, the scattering behavior of the respective cell for the optical radiation is captured, and allows conclusions to be drawn regarding, for example, the cell structure, shape, and reflectivity. This scattering behavior may be used to differentiate different kinds of blood cells and the parameters derived may be used for diagnosing deviations of the blood cells in this sample from a standard, obtained for example from a multiplicity of reference samples classified as normal.

In the case of the automated evaluation of cells in blood smears, the present-day analyzers operate with microscopes having a high numerical aperture and with immersion between the object carrier and the objective, in order to be able to achieve high resolution. A result of this, however, is a comparatively shallow depth of field, which is significantly less than the thickness of the cells perpendicular to the surface of the object carrier with the blood smear. Accordingly, the entire depth information pertaining to the cell cannot be imaged in sharp focus with two-dimensional imaging in only one focus setting.

A frequent result, therefore, are unclearly classified blood cells, which have to be classified subsequently, manually, by specialist staff, e.g., a laboratory physician. For this purpose, the object carrier with the blood smear is placed again under a microscope, the corresponding cell is searched, which is complicated, and the cell is then inspected by the laboratory physician. For reliable classification here, the laboratory physician usually focusses through the cell as well, in order to be able to identify and evaluate the structure of the cell more effectively along the focus direction.

WO 2007/044725 A2, Bahram J., et al.: "Three-dimensional identification of biological microorganism using integral imaging" in Optics Express, vol. 14, No. 25, pages 12096-566, Kim J. et al.: "A single-shot 2D/3D simultaneous imaging microscope based on light field microscopy," in Visual Communications and image processing, vol. 9655, pages 9655101-9655104, and WO 2010/121637 A1 describe optical imaging apparatuses.

In terms of the optical system, the measuring devices currently commonplace within hematology comprise a microscope with about 100-times magnification, with effective lateral resolutions of a sensor element in the object plane of 100 nm=0.1 μm. The commonplace cameras have pixel numbers of no more than 0.3 to 1 million pixels. As a result, the field of view in the object has a size of only a few 100 μm. In order to be able to record and analyze the stained smear of a blood sample, which may be a few mm wide and several 10 mm long, the area of the region of the smear to be analyzed must then be scanned using a displacement unit in a meandering scanning technique. To accelerate the process somewhat, a first, extensive scan is performed at low magnification, e.g., ten times with a field of view correspondingly ten times larger, and, following a first image evaluation for ascertaining the cells to be measured, only the regions of interest (RoI) with the cells are subsequently approached in a targeted way with the higher magnification. This means that a complete extensive analysis of the sample with the high magnification does not take place. In order for the cells to be visualized well enough to allow them to be analyzed with the high-resolution optical microscopy, the blood smears are stained in an upstream step. A number of staining protocols have become established worldwide, which, as seen from a global standpoint, are somewhat different from region to region. Consequently, there are regional limits to the comparability of the analysis of blood smears, since only images of cells that have been stained according to the same protocol can be compared with one another effectively.

Furthermore, the staining of the cells in the blood smears is very time-consuming and of limited reproducibility, owing, for example, to reagents altering due to ageing processes, or different laboratories carrying out staining according to different protocols. The same or similar problems come about with regard to the staining and investigation of other biological preparations, such as tissue samples or microtome sections of tissue samples, for example.

There are in principle a variety of attempts and approaches to the recording of biological or medical samples of cells and/or tissues using optical imaging systems and to the subsequent coloring of the technical images on the basis of structural recognition and/or segmentation of regions of the sample and/or of the optical contrast obtained. A common feature of these approaches is that attempts have been made to stain the coloration on the basis of the two-dimensional image structure together with structural information and/or contrast information. Illustratively, for coloring, via techniques of computer learning with neural networks (deep CNNs, CNNs) or artificial intelligence (AI), a structure is recognized in two-dimensional image data with the additional information pertaining to an optical path length; then a coloration is selected for this region in accordance with the structure or the structural element; and the color saturation/intensity is then determined on the basis of the interferometrically determined optical path length or optical density. These approaches are based on 2D image information or on 2.5D information, i.e., topographical information in the form of a height or optical thickness, which may be a physical and/or optical variable, over the lateral extent of the image. This additional information over the direction orthogonal to the image plane is not further subdivided or differentiated, and must be regarded as summary information. To date, however, all of these approaches have been insufficient, and fail to provide the biologist or medic with sufficiently good images of the kind he or she is used to from conventionally stained biological samples. So far, therefore, it is generally still not possible to do without the staining of the blood smear cells, despite this staining being costly and complicated and intrinsically hampered by a variety of disadvantages.

SUMMARY OF THE INVENTION

An object underlying the invention is therefore the provision of a method for digitally staining a cell and/or medical preparation that provides sufficiently good images for there to be no need for the cells to be stained.

The object is achieved by a method of the invention for digitally staining a cell and/or medical preparation in accordance with the independent claims. Advantageous developments of the invention are provided in particular by the dependent claims as well.

The subject of the invention comprises more particularly a method of the invention for digitally staining a cell and/or medical preparation, the method comprising the steps of:
    a) ascertaining three-dimensional information about a cell and/or medical preparation by means of an analyzer for analyzing a medical sample, the analyzer comprising an apparatus for ascertaining the three-dimensional information about a cell and/or medical preparation,
    b) digitally staining the cell and/or medical preparation in accordance with a predetermined assignment between the three-dimensional information about the cell and/or medical preparation and the staining of a corresponding cell and/or medical preparation and/or cellular and/or subcellular structures of the cell and/or medical preparation by means of a staining protocol,
    c) representing the digitally stained cell and/or preparation, where the representation takes place with a predetermined defocus range, and where regions of the cell and/or preparation with different digital staining in the region of the defocus range are represented as corresponding modulations of color intensities and/or as mixed color.

In one advantageous embodiment of the method of the invention for digitally staining a cell and/or medical preparation, the method comprises the steps of:
    a) ascertaining three-dimensional information about a cell and/or medical preparation by means of an analyzer for analyzing a medical sample, the analyzer comprising an apparatus for ascertaining the three-dimensional information about the cell and/or medical preparation,
    b) digitally staining the cell and/or medical preparation in accordance with a predetermined assignment between the three-dimensional information about the cell and/or medical preparation and the staining of a corresponding cell and/or medical preparation and/or cellular and/or subcellular structures of the cell and/or medical preparation by means of a staining protocol,
    c) displaying and/or storing a two-dimensional image of the digitally stained cell and/or preparation, where the displaying of the two-dimensional image corresponds to the image in a selected focal plane of the cell and/or preparation and where mutually superposed regions of the cell and/or preparation with different digital staining in the region of the defocus range are displayed as corresponding modulations of color intensities and/or as mixed color.

An advantage of the method of the invention is that pretreatment, such as a chemical pretreatment, for example, of the cell can be dispensed with to the furthest possible extent, before image recording and hence the analysis takes place, in order to allow the cell to be investigated in as far as possible an original state in which it has been altered little or not at all. Consequently, there is no need for the time-consuming staining of medical or biological preparations, such as blood smears or tissue samples or microtome sections of tissue samples, for example, which to date has typically taken up about 15 minutes. In addition, there are also advantages to this, for example, since the reproducibility of conventional staining is limited, owing, for example, to ageing processes in reagents or chemicals used, or since different laboratories stain according to different protocols. As no chemical substances are now being consumed, the wastage of chemical substances is reduced. In addition, the entire analytical process is simplified, thus also reducing the risk of cross-contaminations between different samples, for example. A further advantage is that a switch between different staining models is possible, in order, for example, to be more specific for particular pathologies.

One particular advantage of the method of the invention is that because of technical contrasts, images generated by means of microscopy can be retrospectively colored in a way which would also have taken place in the actual staining process, and the biologist or medic, for example, can additionally be supplied with an image of the sample with which he or she is familiar from the existing and established methods. In this context, in particular, even cell constituents in the sample that lie one above another in the direction of observation are displayed in such a way that they then lead to modulations of color intensities and/or to the formation of mixed colors as in the case of a real staining process. The enablement allowing these superimposition effects to be reproduced with extremely high accuracy is a central advantage of the subject of the present invention. In particular, therefore, the advantage arises that an effective staining is determined over a predetermined layer thickness through the cell or preparation.

A "defocus" refers to the offset of an image plane from an excellent image plane, with the excellent image plane often also being called best focus.

A "defocus range" refers accordingly to a depth of field range, in weighted or unweighted form, for example, according to the extent of the defocus from the intended plane or excellent image plane. The depth of field range therefore indicates the range which is utilized for the staining, for example, of the cell or preparation.

In a further advantageous embodiment of the method of the invention, the three-dimensional information ascertained in step a) comprises information about the sample at cellular and/or subcellular orders of magnitude.

Advantageously in accordance with the invention, then, true 3D image information from the sample at the cellular and subcellular level is used in order to determine the colors or the local coloration of the sample on the basis of technically contrasted structural information from the subregions of the cell or tissue. There is a differentiation here of cell regions in all three dimensions of the image recording at a microscopic level and also in the subcellular structures. As a result, it is also possible in particular for regions of tissues that lie one above another to be displayed with corresponding detail in the color saturation and in the case of different tissues to be colored in corresponding mixed colors in that case as well.

For a respectively selected focus position, for example, the image is output as a 2D image on the basis of the three-dimensionally captured data, with the defocus range being determined from the focal plane selected, and the coloration for each image point being determined from the recorded 3D image information. By changing the focal position, the physician or biologist as observer is then able, as familiar from the conventional microscope, to focus through the sample. It is also possible here, on the basis of the three-dimensional data, for the thickness of the sample layer and the focal position to be adapted and selected retrospectively, allowing the physician or biologist, for example, then to be able to look at a subregion in an even more targeted way than has been possible to date.

Because the different cell types and/or structures in cells are advantageously colored differently, it is also possible for certain structures to be selected by the observer in the microscopic image that are not to be displayed. For example, it is now also possible for spatial structures of individual sample constituents to be displayed, looked at and evaluated in a targeted and isolated way.

The individual cell constituents are advantageously colored, for example, by a user selecting a corresponding color table in which particular colors are then assigned to particular cell structures or cells. This color table may then correspond, for example, to one of the known staining protocols. The respective color saturation is then determined on the basis of the 3D information. Where different cell structures are superimposed at an image location, a corresponding mixed color is then determined.

In a further preferred embodiment of the method of the invention, step a) comprises segmentation of the ascertained three-dimensional information for the recognition of cellular and/or subcellular structures of the sample.

In a further preferred embodiment of the method of the invention, the three-dimensional information ascertained in step a) is three-dimensional image information, preferably image information in real space.

In a further preferred embodiment of the method of the invention, the three-dimensional information ascertained in step a) comprises holographic information.

In a further preferred embodiment of the method of the invention, the analyzer for ascertaining the three-dimensional information in step a) comprises an optical microscope for imaging a light field in an object region for imaging the sample, the microscope comprising a light source for illuminating the sample and an objective comprising a converging lens for converging and focusing light beams emanating from the illuminated sample, and a digital recording device for recording the light beams, where a light field camera for recording the light field from the object region that is imaged in the microscope is provided on the microscope, where preferably the light field camera comprises the digital recording device.

The analyzer is preferably an automated analyzer, more preferably a semiautomated or fully automated analyzer. More preferably, the analyzer is an automated hematology analyzer and the cell is preferably a blood cell.

The microscope preferably comprises the light field camera. The light field camera preferably comprises the digital recording device, which is configured to record the light field imaged in the microscope. The digital recording device preferably comprises a charge-coupled device (CCD) chip or plurality of CCD chips. With particular preference, the digital recording device is based on a complementary metal oxide semiconductor (CMOS) technology and/or comprises a CMOS chip.

The introduction of the sample within the automatic analyzer is preferably fully automatic, by means, for example, of corresponding flow systems and/or displacement of sample carriers within the analyzer, preferably by means of appropriately controlled actuators or robotic systems.

The light field camera preferably comprises a microlens array with lenses of different focal lengths, where the microlens array is able to image an intermediate image of the light field imaged in the microscope onto the digital recording device.

The microlens array here has a minimum distance of one focal length of the intermediate image and there is real imaging. Hence, in accordance with the invention the images produced are not aperture images but rather real, small image details in the sense of small partial images of the object or the sample. The image information is then projected back through the optical unit until the beams of corresponding image points from different partial images meet. In the present case, therefore, the images captured are not directional images but rather small object images.

The analyzer is based advantageously on an optical microscope which is equipped, for example, with apparatuses for differential interference contrast. In respect of the splitting, such microscopes may be adapted to the requirements of hematology. This adaptation is accomplished substantially by a targeted choice of the beam offset on the beam path through the object under measurement. The object under measurement is, for example, a smeared blood sample.

The beam offset is determined by the thickness of the DIC prisms in the illumination module and in the analyzer module. It is necessary here for the optical thickness of the two prisms and the direction of the beam offset to be matched to one another, so that the analyzer module can completely reverse and therewith compensate the beam offset from the illumination module again. The physical thicknesses of the prisms may therefore deviate from one another on account of different imaging scales. In the case of microscopes, there may be a plurality of pairs of DIC prisms for one objective, which allow different splits.

Furthermore, a light field camera, also called a plenoptic camera, may advantageously be provided on the microscope; it records the light field from the object plane that is imaged in the microscope.

The light field camera preferably has an effective f-number (working f #) in the range from 10 to 30, and more preferably an f-number of 26. Depending on the desired scanning of the object of measurement using sensor elements, a suitable magnification is chosen for this purpose, taking account of the size relationship between the real sensor element, which is in the range of typically 1 to 10 μm, and the scanning of the object, which is in the range from 0.05 to 0.5 μm; the range from 0.05 μm to 0.15 μm is preferred here on account of the high resolution requirements for the measurement. This then yields effective system magnifications from the object to the detection facility in the range from 10 times to 100 times, preferably in the range from 20 times to 65 times, and more preferably in the range from 40 times to 65 times. Where an immersion liquid is used for the required high resolution, the numerical aperture may adopt values in the region of 1.4. If the sample is surrounded by air, the numerical aperture is limited to a value of max. 1, technically up to 0.95 or 0.9.

The image-side NA is given by the object-side NA divided by the magnification NA_image=NA_obj/M.

The numerical aperture NA and the f-number (f #) of the optical system are linked via f #=1/(2*NA).

Accordingly, for magnifications of 40 and 63 and numerical apertures of 0.95 and 1.4, respectively, the corresponding f #is in the range from 14 to 33.

The light field camera is preferably, for example, a light field camera bearing the designation Raytrix R12 Micro Series from Raytrix GmbH, Kiel.

The image of the object for different depths can be reconstructed from the light field, corresponding to different focus settings of the microscope. This purely digital refocusing may take place on the recorded data sets at a later stage.

The advantageous analyzer has the advantage that not only the color information RGB but also depth information D is available, and may be used as a further feature in analogy to a color channel in a downstream computer-based evaluation.

For example, based on the additional depth information, the cells can be segmented more easily, i.e., may be recognized for the further analysis and cut out of the image. In addition to color contrast transitions, transitions then also arise in the height profile at the edges of the cells, these transitions being detectable effectively and accurately.

A problem hitherto existing with conventional systems is that of reliably determining the edge of a cell on the basis of the color image only, because normally a threshold value is used for this purpose, this threshold value being already located within the cell, owing to the system, since, indeed, a certain change must have already taken place in order for the threshold value to have been reached. Therefore, cells are usually measured systematically to be smaller than they are. This is a disruptive factor in the case of volume measurements, and attempts are then made to correct this by means, for example, of interpolation algorithms. With the provision and use of the depth information, these problems can be easily and reliably solved, since the background of the object carrier constitutes a plane onto which the profile falls. It is then possible for known techniques for the geometric determination of the cell edges on the basis of height profiles to be applied accordingly.

As a result of the recording of the light field with the light field camera, the image recorded—for example, the blood smear or the cells—can still be refocused offline after image recording. This may be utilized, on the one hand, to focus the cells in the best possible way for segmentation and recognition for the purpose of classification, or else to use a plurality of focal planes in parallel for the purposes of segmentation and classification. An alternative possibility, moreover, is the use of volume data and/or 3D point clouds. As a result, the segmentation and classification can be implemented with greater accuracy.

Where the images—of the cells, for example—have been recorded with the light field camera, the possibility exists of focusing through the images at a later stage, i.e., offline, in a purely digital procedure. In the event of unclear classifications or evaluations of cells by the computer, this would provide the physician with the option of looking at the cells directly in the digital image and not first having to place the object carrier under a microscope again, search for the cell, and then perform a more accurate evaluation and classification by varying the focus. Because coordinate systems of the cell analyzer and of the microscope are not matched to one another, the physician has to date been able to position the cell under investigation in the microscope only with an approximate indication of location, and has had finally to look for the cell within the microscope. This is time-consuming and must be carried out in the laboratory. If, however, the digital image from the light field camera is present, in accordance with the present invention, the physician is able to focus through the cell or structure in question directly in the digital image.

This evaluation and classification is then also possible in the concept of telemedicine if there is a data link between the physician and the image or the image database, and so the physician no longer has to go to the object carrier in the laboratory.

In the event of findings being unclear, this also facilitates the consulting of a colleague to whom the image is sent for analysis or for whom the image is made available by way, for example, of electronic networks; in the case of digital data transmission, this can be implemented virtually in real time. For evaluation and classification of the recorded light field images of the blood cells, the respective physician requires only appropriate analytical software on their digital terminal or else, in the concept of a cloud solution, it is possible not only for the image from the light field camera to be stored in the cloud but also for the evaluation to be made in a cloud-based application, via a web browser interface, for example.

The magnification is preferably determined from the requirement regarding the optical resolution for the scanning of the object under measurement; the choice of the magnification is generally linked to the required effective f-number or numerical aperture.

The lateral resolution is preferably 100 nm in the object plane. In that case, together with the lateral dimension of a sensor element, the magnification comes out at M=lateral dimension of sensor element/100 nm.

This magnification is particularly advantageous, for example, for the imaging of blood cells.

About 100 nm is the typical resolution limit of light microscopy in the case of water, oil, or glycerol immersion. For a known pixel size of the camera of 4.5 μm, for example, the required magnification would consequently be 45 times. The aperture is then given by the aperture in the object plane—in the case of immersion, in the range greater than 1, typically 1.2 to 1.4-divided by the magnification, i.e., NA camera=1.4/M, e.g., 1.4/45=0.031. The f-number is then given by f #=½ *NA as f #16. The f-number of the camera is preferably 2.4, 2.8, 5.6, 7.0 or 26.0. With particular preference the f-number f #of the camera is 26 and the magnification is 63 times.

For a camera pixel size of 2 μm, a magnification of 20× is preferred for the desired resolution in the object plane. Accordingly, NA camera=1.4/20=0.07 and hence the f-number f #is 7. An advantage of this is that large fields of view can be covered with high resolution camera chips having a high pixel count, and, furthermore, the outlay for the optical system can be minimized.

The medical sample preferably comprises a cell and/or a medical preparation. The medical preparation is preferably a tissue section, sediments of bodily secretions and/or body fluids, and/or microcrystals.

More preferably the sample is a blood sample and/or the cell is a blood cell.

Instead of blood cells, the sample may preferably be any kind of human, animal, or plant cell. This has the advantage that a very wide variety of different types of sample, including a wide variety of different cell types, can be examined and characterized.

The combination of a light field camera with a microscope for hematology is significantly complemented further by way of extending contrasting techniques, such as, for example, phase contrast or differential interference contrast (DIC).

The microscope is preferably an amplitude contrast microscope and/or a phase contrast microscope and/or a differential interference contrast (DIC) microscope.

The microscope is preferably a differential digital holographic microscope.

The extended contrasting techniques, including more particularly the DIC, make it possible for phase differences in the light paths through the sample—that is in this case, for example, the cells—to be made visible. Different phase values, particularly in the case of phase contrast, may then be represented with different colors and so measured using a color camera. As a result, it is possible to forgo staining of the samples while nevertheless imaging the cells with good contrast. Existing systems for automated cell classification may utilize exclusively the amplitude contrast which arises from the staining of the cells and from the different pathways of the light in the cell or, alternatively, in the surrounding media.

Through the combination of a microscope and of a light field camera, additional 3D information pertaining to the cell is obtained, and can be employed for classifying the cell. Depending on the selected contrasting technique in the microscope, therefore, the data set forth below is obtained for classification of the cells. The classification may be carried out, for example, by specialist medical staff and/or by computer-based systems. In the case of amplitude contrast, conventional image information and also 3D information pertaining to the cell, additionally, is available. In the case of phase contrast, a phase image and also, additionally, 3D information pertaining to the cell are obtained. In the case of DIC, a DIC image relating to differential phase images is obtained, and 3D information pertaining to the cell is also obtained.

In accordance with the invention, the 3D information about the cell that is obtained may advantageously be represented, for example, differently as set forth below.

The 3D information about the cell is advantageously represented as an RGB image. The RGB image is advantageously imaged in focus over the entire depth of field range of the light field camera, in the form of what is called a total focus image. As a result of the increased depth of field range as compared with conventional 2D cameras, therefore, more depth information is captured. Depending on its type and alignment, a blood cell has a thickness of about 1 to 2 μm, up to around 20 μm. The depth of field of the image, however, for NA 1.3 and wavelength of 500 nm, is only d=±λ/NAˆ2=±500 nm/1.69=±300 nm. In the conventional 2D image, therefore, none of the cells is imaged in focus over the full depth. The depth of field is increased by a factor of at least four by way of the plenoptic effect of the light field camera. Consequently, cells, especially, for example, red blood cells (RGB), are imaged completely in focus. Larger cells as well, such as white blood cells (WBC), for example, are imaged in focus over a substantially greater part of the cell volume.

In a further advantageous embodiment, the 3D information pertaining to the cell is presented as RGB D information. Each image point contains depth information referred to as D. If, for example, blood cells are applied as sample on an object carrier, for example, then D is the thickness of the blood cell, for example. This information complements the color information and is also referred to as a 3D point cloud.

In a further advantageous embodiment, the 3D information pertaining to the cell is presented as volumetric 3D information. In analogy to an image from a computed tomograph (CT), spatial image information is produced accordingly in the form of voxels. Since the cells, blood cells, for example, are at least partly transparent for the radiation, different points in the cell are able to generate scattered radiation, which is recorded by the camera and assigned to different depths.

In a further advantageous embodiment, an image stack can be calculated from the data record of the light field camera, this image stack being calculated at different focal planes and so containing the volumetric information. In the evaluation algorithm of the light field camera, the so-called virtual depth is available as a spacing measure for the planes. The focal planes alternatively may also be calculated with different spacing values, which are selected, for example, equidistantly and of which one plane coincides with the max cross section of the cell.

In the case of contrasting with phase contrast, the image of the light field camera is based only on the intensity modulations generated by the phase event, since the amplitude modulation and intensity modulation from the object itself are filtered out in the phase ring. This image is a very largely true color image, in relation to the image with pure amplitude contrast.

In the case of contrasting with DIC, the image of the light field camera is based on an image of the cells which, by way of the differential interference contrast, contains information about the different pathways of the light traveling through the cell and hence about the phase shift of the light, as color-coded information. This offers the advantage that the color representation of the cell superimposes a fine structure, with great usefulness for the evaluation algorithms of the light field camera in respect of high lateral resolution when calculating the depth information.

In one advantageous embodiment, up to four color channels with RGB and white are used.

The spectrum of the illumination advantageously comprises the visible range and/or near IR wavelengths.

There is preferably a color balance between the light source and a camera, such as the light field camera, for example. Preferably, moreover, there is an adaptation between exposure time and gain for the three-chip RGB color camera for the 2D images. With particular preference the light source comprises a four LED light source with RGB and W and also a common brightness control.

In a further preferred embodiment of the invention, the analyzer on the microscope has a further camera for recording an image in an object plane in the object region, where the further camera has a lateral resolution equal to or, preferably, higher than the lateral resolution of the light field camera, where the resolution of the further camera is twice, preferably three times, more preferably four times the resolution of the light field camera.

The further camera preferably has a larger field of view than the light field camera. This enables better and faster coverage of the sample.

The focal plane of the further camera, preferably a 2D camera, is preferably coupled to a marked plane of the light field camera. This may be measured for example in terms of virtual depth. Hence it is possible advantageously to ensure that both cameras supply good images at the same time.

In a further preferred embodiment of the invention, the further camera is a color camera, preferably a multichip color camera, more preferably a three-chip color camera.

The advantage of this is that by means of the high-resolution color camera, such as a high-resolution RGB camera, a high resolution is ensured. This is particularly advantageous because in the case of the light field camera, as a matter of principle, the camera loses lateral resolution by a factor of two and two-dimensional resolution by a factor of four in order to obtain information regarding the calculation of the depth resolution. This loss of resolution can therefore, advantageously, be fully compensated.

The use of a multichip color camera, e.g., of a three-chip color camera, has the advantage that in that case better color measurement and, in particular, pixel-by-pixel color determination are also possible without interpolation and with a greater dynamic range, with consequent further advantages for the classification of cells.

Color channels are advantageously balanced for an optimized S/N ratio. In the case of stained samples, for example, balancing is preferably carried out separately for each staining protocol. The three-chip color camera is advantageously a three-chip CMOS camera with 3.2 megapixels per chip.

A three-chip color camera is preferred over, say, a one-chip color camera in that a one-chip color camera usually employs a Bayer pattern. Since the analysis of, for example, blood cells in a hematology analyzer is dependent in particular, for example, on good color resolution and color fidelity and also on good structural resolution laterally, the three-chip cameras are preferred here. The high-resolution color camera supplies, for example, an RGB image with high resolution and typically better chromaticities, i.e., more accurate chromaticities, and lower noise, if the exposure is optimized separately for each of the color channels. In the case of the three-chip color camera, the chromaticities are separately determined directly and without interpolation for each pixel.

Subsequently, with preference, the chromaticities of a color camera are transferred from the RGB representation to, for example, an HSV representation, for hue, saturation, and brightness (value); in this way, for example, red blood corpuscles, where the red dye is distributed uniformly in the cell, can be readily segmented as well by way of the hue, as an additional or complementary technique. This approach works well for all cells and structures which homogeneously have the same hue or are stained with the same color. This segmentation may advantageously be combined with that performed by way of the depth values (D), in order to have an extremely precise criterion for cutting out the cell.

The images from the two cameras are advantageously registered to one another by way of scaling and/or pixel interpolation, if the effective pixel sizes in the images do not fit together correspondingly or are commensurable with an integral factor for example of 1, 2, 3, etc. For this, lateral displacements, twists, tilts, distortions and/or optical distortions in the images and/or else a defocus should in principle advantageously be corrected. Once the images have been registered to the required extent, new image data are calculated, combining the higher lateral color resolution with the depth information from the image from the light field camera. For this purpose, the image from the color camera can be placed at the associated focal position in the evaluated depth image from the light field camera, and, from there, the color representations and lateral resolutions can also be transferred to adjacent focal planes by way of the propagation of the light field, which is known from the recording by the light field camera.

This transfer may be made, for example, laterally by way of interpolation, and via correspondence tables for the colors, for example. An alternative possibility involves a more complicated transfer by way of a true propagation calculation based on the data measured by the light field camera, together, for example, with a phase retrieval. In this case, evaluated image planes of the light field camera serve as support points, and the further, additional points are supported by way of the neighboring points.

Based on the one marked plane and together with suitable continuity conditions for the optical fields and the associated calculated optical wavefronts, a comparatively precise and comprehensive interpolation is possible.

This more accurate solution, which is typically very computationally intensive, is advantageously used for precision diagnostics, on conspicuous image regions, for cells with unclear findings and/or for pathological cells, for example, where real-time capability is less important or unimportant. For example, precision diagnostics can also be implemented, for example, on the entire image or else only in image details, such as on individual segmented cells, for example, with or without expansion to include certain edge regions around them.

Depending on the arrangement in the beam path, there are different variants as set out below, each with their advantages, provided in accordance with the invention, in relation to the arrangement.

For the measurement of stained cells or preparations or those which in the images supply a good contrast without extended contrasting techniques, the two cameras may be used and operated simultaneously on the microscope. In the case of living or motile cells or samples or in the case of examinations using microfluidic cells, it may be advantageous if the two cameras also record the images in a time-synchronous manner.

In this context use may be made, for example, of commercially customary microscope tubes, which mechanically enable the parallel operation of two cameras on one microscope. There are various ways of splitting the beam here, examples being the splitting ratio, the splitting technique such as spectral separation, polarization separation, etc., and these may be advantageously selected accordingly.

With unstained cells, which require extended optical contrasting techniques, the method of the invention optionally provides further preferred technical embodiments of the analyzer in accordance with the invention.

Preferably just one polarization direction is utilized for the color image. For this, separation of the beam paths for the color camera and the light field camera between the objective and the DIC analyzer or alternatively between the objective and upstream of the objective-side DIC prism is envisaged.

The division of the light field on the imaging side is preferably taken into account during the actual alignment of the polarization prior to the splitting, in the illumination module, in such a way that downstream of the DIC prism and DIC analyzer, the two polarization components have the desired intensity ratio, such as 1:1, for example, for a maximum contrast. This allows light losses to be minimized, in order thus to optimize the efficiency of the overall construction and to minimize the required exposure times for rapid measurement.

The division of the beam path for the two cameras between the imaging objective and the DIC analyzer is accomplished preferably with a polarization-neutral beam splitter. In that case a polarizer should be arranged, additionally, in the beam path to the high-resolution color camera, such that the polarizer almost completely blocks one polarization direction of the DIC beam path and allows the other to pass to the camera with as little attenuation as possible. This polarizer may either operate in transmission or in reflection or lead to a spatial separation of the differently polarized beams. This affords the advantage that the construction is less complex in design and does not require any particular polarization-dependent adjustment; however, around 25% of the quantity of light is lost as a result of this principle.

The images from the light field camera and from the color camera are advantageously aligned and scaled in a manner fitting one another so that the 3D information or height information from the light field camera can be utilized in a topography image, for example, and at the same time the color information from the color camera can be employed and utilized.

The light field camera and the color camera preferably record synchronously. This may be achieved, for example, by appropriate triggering. The triggering may be implemented by hardware or else by way of software. The triggering may also be implemented from a selected first camera to the second camera, this also being referred to as master-slave coupling. In functional terms it is necessary to ensure that the images are recorded with a specified temporal reference, ideally synchronously. As a result of possible latency times in the hardware and software of the cameras and of the respective actuation thereof, the trigger signals themselves may have a temporal spacing. The synchronous recording is especially advantageous for the recording of motile cells, in a flow cell, for example, and/or of living cells or measurement objects.

Advantageously the images from the light field camera and from the further, high-resolution camera are combined only in sections for image regions, as for example only in a region in which measurement objects to be studied have been recognized or detected in an automated measuring process. An advantage of this is that the measuring speed can be increased, as computational outlay and computation time can be saved accordingly.

Different configurations may be advantageous according to the arrangement in the beam path.

In one advantageous configuration, only one polarization direction is utilized for the color image, and the beam paths for the color camera and the light field camera are separated upstream of the DIC analyzer or even upstream of an objective-side DIC prism. The division of the light field may be taken into account when aligning the polarization prior to the splitting in the illumination module, advantageously, in such a way that the two polarization components have the desired intensity ratio, such as 1:1 for maximum contrast, for example, downstream of the DIC prism and DIC analyzer. This is especially advantageous particularly when stained cells are to be imaged and analyzed.

In a further advantageous configuration, the color camera is utilized for high-resolution DIC and the plenoptic system is used for an extended depth measurement range for unique unwrapping of the color regions for the purpose of measuring relatively thick cells or cell clusters. A high-resolution relative thickness measurement is therefore implemented by means of DIC, through integration of the differential contrast information, for example, and through a relatively large-area assignment by means of the plenoptic system.

In the case of unstained samples, cells for example, the amplitude contrast contains hardly any information or none, and the color image is employed advantageously only for phase contrast or DIC contrast, which in that case, however, has a high lateral resolution with a real color separation per pixel.

In one advantageous configuration, the light field camera and the high-resolution camera, which advantageously comprises a color camera, are aligned relative to one another with respect to the axial directions of the sensor array and advantageously also with respect to the subpixel-accurate shift along the axial directions of the array and/or with respect to a direction-dependent scaling factor for the x-axis and/or y-axis, for example.

In one advantageous configuration the position of the focus of the high-resolution camera is set to the central measurement region of the light field camera. This has the advantage that the light-field camera can also be utilized, in process terms, in a manner similar to an autofocus system.

As the effective f-number f #becomes smaller, there is an increase in the achievable depth resolution of the light field camera. Hence an f-number of 7 may be significantly more advantageous than an f-number 26. A smaller f-number means a higher image-side aperture. Since the object-side aperture is restricted to 1.4 in the case of the immersion typical for biological samples, the maximum image-side aperture in relation to NA camera=1.4/M.

The object is advantageously imaged with the full imaging aperture on the microscope itself, in order, on the image side, to illuminate the full aperture of the working f #so that the light field camera works well and is able to provide high lateral scanning. In the most favorable case, NA illumination=NA objective. This is also referred to as incoherent illumination with sigma=$\sigma$=NA illumination/NA objective=1.

In one advantageous configuration of the automatic analyzer of the invention, the incoherent illumination sigma on the microscope is greater than 0.8, preferably greater than 0.9, more preferably 1.0, with sigma being the ratio between the numerical aperture of the illumination of the sample and the numerical aperture of the objective, and with the microscope preferably being a differential interference contrast (DIC) microscope.

In hematology, this $\sigma=1$ or $\sigma>0.8$ or desirably $\sigma>0.9$ is very important, since the blood cells are weakly scattering objects and therefore the aperture is filled sufficiently with light even for a microlens array in the light field camera.

To date, in general, illuminations according to Köhler with a sigma=0.7 were used in light microscopy for the purpose of optimizing the contrast—particularly for visual observation, but also in the case of cameras. Here, however, this would result in an aperture not sufficiently filled with light, and consequently it could not be very accurate depth determination. Moreover, a major part of the spatial resolution would be lost on account of the not fully illuminated pixels. This is connected to the fact that the number of pixels used increases approximately quadratically with the value of sigma for the calculation of the images, and the maximum close to the completed detector resolution is reached at $\sigma=1$.

In one advantageous embodiment of the analyzer in accordance with the invention, the analyzer comprises a sample supply facility for object carriers, by means of which samples can be supplied on an object carrier to the analyzer.

In an advantageous configuration of the analyzer, in accordance with the invention, the analyzer comprises a flow cell for supplying the sample, with the object plane of the microscope preferably lying in the flow cell. The flow cell is preferably a microfluidic flow cell.

This is advantageous in that, in particular, cells or blood cells can be imaged and analyzed in the natural surroundings. It is possible in particular to avoid the necessity of applying the cells as a smear on an object carrier, where they are frequently dried and/or stained, which may significantly alter their original, natural properties, such as shape, for example. Moreover, the corresponding preparation outlay for the production of smears and the staining falls away, and waste is avoided to a considerable extent, through the absence of consumption of, for example, object carriers and coverslips for the smears. Similarly, storage capacities in terms of the smears and consumables are avoided. On the system level of the analyzer, the apparatuses for automated switchover of the smears are not needed, and this has consequences including a considerable simplification of instrument construction.

Given that the thickness of the utilizable layer in a flow cell is typically several micrometers, in some cases even a number of 10 μm, it is difficult to position the cells precisely in the object plane of the microscope optical system utilized for the examination. In this regard, there is a trade-off between the desire for high resolution on the one hand, the not so precise position of the cell in the direction of the optical axis on the other.

Preferably, here, the depth measurement of the light field camera can then be used to optimize the actuation parameters for the microfluidic system, in order thus, for example, to set the focus appropriately so that even the 2D high resolution images are in focus. Exposure and 3D images also provide added value without interferometry, as in the case of DHM, which is costly and complex and in some cases is subject to disruptions as a result of effects with temporally and/or spatially coherent radiation.

The lateral resolution becomes better with increasing numerical aperture NA of the optical system, by way of the relationship $\delta=0.5\lambda/NA$. On the other hand, with the numerical aperture, the depth of field reduces in accordance with $d=\pm\lambda/NA^2$. At 500 nm wavelength and NA=0.7, the depth of field overall is then 2 μm, which corresponds approximately to the thickness of red blood cells.

The instruments customary to date operate with an optical system having apertures of NA=0.5, which at 500 nm then corresponds to a depth of field overall of d=4 μm. Via the NA=0.5, the achievable lateral resolution is limited to $\delta=0.5$ μm. To date, therefore, it has been necessary to choose an appropriate compromise of the choice of the numerical aperture in order to achieve a balance between lateral resolution and depth of field. The stated relationships describe the resolution of optical instruments in the current theory.

In an automated analyzer of the invention with a corresponding light field camera, the depth measurement range, in other words the region in which images are recorded in focus, can be increased by a factor of about 4 to about 6. Conversely, the lateral resolution of the light field camera drops by a factor of 2.

Since, when selecting the optical system used, the magnification and the aperture can be selected largely independently of one another, however, this effect can be effectively compensated. For example, if a larger magnification and also a higher aperture are selected, the effect can be used in a correspondingly positive way.

If, for example, a magnification of 60 times to 80 times and an aperture of NA 0.7 are selected, the values arising for a wavelength of 500 nm are roughly as follows: NA=0.7, $\delta=0.36$ μm, depth of field d=1.05 μm. With the effect for increasing the depth working range from the plenoptic camera, values for an increased depth of field of d=5.25 μm are obtained, on the assumption of an increase by a factor of about 5.

If, for example, a magnification of 60 times to 80 times and an aperture of NA 0.9 are selected, the values arising for a wavelength of 500 nm are roughly as follows: NA=0.9, $\delta=0.28$ μm, depth of field d=0.62 μm. With the effect for increasing the depth working range from the plenoptic camera, values for an increased depth of field of d=3.10 μm are obtained, on the assumption of an increase by a factor of about 5.

By means of the deployment of the light field camera in a cell analyzer, therefore, the depth working range can be greatly increased, which then accordingly enables the use of a flow cell. In particular, a more complete or complete capture of the extent of a cell becomes possible over the height of the flow in the flow cell. This enables, in particular, precise investigations on typically unstained cells. For certain investigations, however, it may also be advantageous or necessary for the cells to be stained in the medium of the microfluidic system.

A further advantage is that the parameters of the flow cell can be located in a wider parameter range, in terms of focusing and/or position of the cell, and for example it is possible to do without a corresponding specific optimization.

In a preferred configuration, the field of view of the microscope embraces the full width of the flow cell through which cells can flow. This region advantageously has a width of a few 1/10 mm up to a few mm.

In one preferred embodiment of the automatic analyzer, the analyzer comprises means both to be able to view object carriers with cells and/or to be able to view cells in the flow cell. In this case, advantageously, the dimensions of the flow cell are matched to the dimensions of the object carriers, more particularly their thickness and hence the optical effects thereof. The covering of the flow cell—that is, the coverslip and any fluidic media located between the region or plane of the cells and the outer surface of the flow cell—advantageously likewise have the same effect optically, in terms, for example, of optical path lengths, dispersion and/or refractive index, allowing the same optical systems to be used and retaining the same best-possible imaging quality. With preference there may be refocusing, in order to adapt to manufacturing tolerances, for example. Typical cover glass thicknesses are in the range below 0.2 mm, typically 0.15 to 0.17 mm. The lateral dimensions of object carriers are, for example, 76 mm by 26 mm or 75 mm by 25 mm in accordance with DIN ISO 8037-1, with a thickness in the range from 1 mm to 1.5 mm. The dimensions of the flow cell then advantageously result correspondingly.

In a preferred configuration, the movement speed of the cells in the flow cell in the imaging region of the microscope is adapted to the exposure time of the image recording systems employed. The movement here is typically less than ½ pixel (pxl), preferably less than ⅓ pxl, more preferably less than ¹⁄₁₀ pxl. An advantage of this is that motion blurring effects can be reduced or avoided entirely.

In a further advantageous configuration of the analyzer, the analyzer comprises a sample supply facility for object carriers. This may be advantageous particularly when, for example, the targets for examination are tissue sections or other medical preparations.

In one advantageous configuration, the method of the invention for digitally staining a cell and/or medical preparation further comprises in step a) the following steps of a method for ascertaining three-dimensional information pertaining to a cell by means of an analyzer:

a1) supplying a sample with a cell to the microscope,
b1) recording the light beams emanating from the cell in the illuminated sample by means of the digital recording device,
c1) imaging the light field imaged in the microscope from the object region by means of the light field camera, where the light field camera comprises the digital recording device.
d1) Ascertaining three-dimensional information pertaining to the cell from information recorded in step b1) about the light beams and/or from information about the light field imaged in step c1).

Steps b1) and c1) may also advantageously be joined into one step, the step in that case comprising:

imaging the light field imaged in the microscope from the object region by means of the light field camera, and
recording the light beams emanating from the cell in the illuminated sample by means of the digital recording device, where the light field camera comprises the digital recording device.

In step b1) the light beams emanating from the cell in the illuminated sample are preferably first of all focused and then recorded by means of the digital recording device. With preference there is conversion of the photons into electrical charge, with subsequent determination of a charge quantity and digitization of the value for the charge quantity.

Rather than about the cell, three-dimensional information about a medical preparation may preferably also be ascertained correspondingly.

The sample in step a1) is preferably supplied to the analyzer by means of a flow cell, with the object plane of the microscope lying in the flow cells. The flow cell preferably comprises means that enable an accumulation of the cells in a marked plane in the flow cell as a result of corresponding actuation of the flow cell. The object plane is preferably adjusted with respect to the marked plane, so that advantageously the object plane and the marked plane coincide.

In step a1) the sample is preferably supplied to the analyzer on an object carrier by means of a sample supply facility for object carriers.

The method preferably further comprises a step in which an image in an object plane in the object region is provided by means of a further camera for recording an image in the object plane in the object region, where the further camera has a higher lateral resolution than the lateral resolution of the light field camera, where the resolution of the further camera is preferably twice, more preferably four times the resolution of the light field camera, and where the further camera preferably has a larger field of view than the light field camera.

The further camera is preferably a color camera, preferably a three-chip color camera.

The cells and/or medical preparations are preferably not stained. In this case the extended contrasting techniques, such as phase contrast and/or differential interference contrast, for example, are particularly advantageous, especially for the imaging of cells. In the case, for example, of sediments or other samples, amplitude contrast may optionally also be advantageous.

In one preferred configuration of the method, the method for ascertaining three-dimensional information pertaining to a cell by means of an analyzer further comprises the step of:

e1) carrying out digital refocusing or focus variation by means of the two-dimensional or three-dimensional and/or volumetric information about the cell, ascertained in step d) along the optical axis of the microscope, where preferably the digital refocusing takes place with computer assistance and/or numerically.

This has the advantage that the refocusing or focus variation provided in accordance with the invention for the first time facilitates telemetric findings in hematology. Consequently, findings by way of consultation, such as by experts at other locations, or else retrospective findings, are also facilitated. In order to carry out this with the established high quality of the findings, as per the standard of care, it is imperative to provide the retrospectively examining or consulted physician with an option for focusing through the cell plane.

In the prior art, the corresponding object carrier with the relevant cells in question was previously retrieved physically from, for example, a rack, a storage box or an archive and then placed under a microscope, and the image was focused onto the respective cell in each case. On the basis of relatively imprecise spatial information regarding the position of the respective cells on the object carrier, attempts were then made to find the respective cells again. If the cells were found again, findings are made. For the findings themselves, the physician analyzes the optical image of the cells and usually also focusses through the cell. The existing systems and techniques are therefore unsuitable, or of only limited suitability, for detailed retrospective findings, since the physicians can no longer focus through the cell image once it has been recorded, and therefore depth information which is important for the findings is not accessible.

Consequently, there is an advantage in recording the cell image as a three-dimensional image, in order thus to provide the physician, in the digitally stored image, with freely adjustable focusing to different focal planes, this focusing being selectable at any time, including subsequently. In this case, the physician need no longer themselves sit at a microscope; instead, the procedure can be undertaken independently of the sample in terms of space and time. As the image is present in purely digital form there is no deterioration in the data over the time elapsing from the recording of the image, in contrast to the hitherto commonplace procedures, with which the archived samples undergo ageing over time and deteriorate in their condition. For each retrospective finding, the sample would be inserted back into the microscope and treated with immersion oil. After findings have been obtained, the sample is then cleaned again, and this may also lead to damage and, overall, represents a certain consumption of time.

A further advantage is that, if a plurality of cells are located on an image, the focus can be successively adjusted correspondingly and varied in respect of each individual one of the respectively imaged cells.

In another preferred configuration of the method, the method for ascertaining three-dimensional information pertaining to a cell by means of an analyzer further comprises the step of:

f1) assigning the cell to a cell type on the basis of predetermined information and of the three-dimensional information pertaining to the cell that was ascertained in step d).

An advantage of this is that the cell can be assigned automatedly to a cell type in a particularly reliable and less error-susceptible way.

In a further advantageous configuration of the method of the invention for digitally staining a cell and/or medical preparation, the method for digitally staining a cell and/or medical preparation comprises a method for assigning a cell to a cell type, comprising a method for ascertaining three-dimensional information pertaining to the cell, where steps a1) to d1) are performed at a first location, and where the information ascertained in step d1) is transferred digitally via a data and/or network connection to a second location, and where steps e1) and f1) are carried out at the second location.

Another subject of the invention is a corresponding method for assigning a cell to a cell type, where, however, three-dimensional information pertaining to the cell is ascertained on the basis of another suitable method for ascertaining three-dimensional information pertaining to the cell.

An advantage of this is that it enables telemedicine for hematology. For example, findings by consultation from experts at different locations become possible. Consequently, precision diagnosis with focusing can also be undertaken remotely on a recorded cell. In addition, this allows a second physician to be consulted for a subsequent classification or counter-classification in order to verify the diagnosis in the database. Accordingly, for example, a ground truth data record may also be developed, with special and, in particular, rare pathologies, since the physicians can come together on a worldwide basis more easily and efficiently by way of the remote functionality and the findings with 3D images.

Verified findings in cloud server data records are utilized advantageously for the automatic extension of a training data record, especially in pathological cases.

Advantageously, a worldwide-learning system is established. This makes it possible for even relatively large data records to be compiled extremely rapidly, even for very rare clinical pictures. These data records may then advantageously also be utilized for automated computer learning algorithms, so that ultimately a broader and verified basis is available as well for the automated evaluation and/or assignment of the cells.

The patient data as well are advantageously held in a database. This has the advantage that earlier data records for blood image recordings can also be analyzed for clinical pictures occurring later, and can be examined for noticeable phenomena; in the case of hematology, for example, it is possible for very early development stages or indications of leukemia to be discovered and/or recognized. If this data has been learned by a system, this analysis can be applied to the images in an automated manner and without additional outlay, since the cell images advantageously are pre-evaluated by computers.

The cells and/or samples are preferably presented by means of 3D display facility, preferably, for example, autostereoscopic 3D display. This enables the physician to be provided with an innovative 3D visual impression of the cells and/or samples under examination. In particular, this advantage is also obtained, according to the invention, in telemedicine.

Advantageously, a compact data format is used for the image data from the light field camera. The image data is preferably compressed. This allows the storage space required to be kept as small as possible, this being a precondition for the storage of the numerous patient data records, which may then be used as a ground truth—for a computer-learning system as well, for example—in the sense of automated medicine and/or as a valuable assistance system for physicians.

Cloud solutions and/or server solutions are utilized advantageously for image storage and data from the findings, and advantageously as well for the securement of extended data relating to the person—the physician for example—the time and the system, including configuration or else software version, through which the findings for the relevant cell were made, or else the time and place at which the relevant sample was taken from the patient, and information concerning transport to the laboratory. Alternatively, this information may preferably also be provided via a link to a different storage system. The time of the findings is advantageously also stored correspondingly.

With preference, a medical preparation is stained correspondingly, rather than the cell.

The three-dimensional information, 2.5-dimensional information and/or two-dimensional information pertaining to the cell is advantageously geometric information about the structure of the cell or medical preparation.

In this context, three-dimensional information, or three-dimensional image information, is understood to mean, for example, that the image, as well as the planar image information, additionally contains depth information, at least for one image point, in the axial direction of the imaging beam path, i.e., for example, in the Z-direction, which is linearly independent of the X- and the Y-direction. This depth information is subdivided further, and for the at least one image point comprises information for at least two, preferably three, more preferably for at least digit 4, different positions in the Z-direction. The depth information is therefore further subdivided and/or differentiated. Accordingly, the depth information is preferably to be regarded as not merely summary. An example of three-dimensional information or three-dimensional image information might be, for example, a three-dimensional imaging of an object that encompasses information, lying on at least two different faces, for an array with image points in X-direction and Y-direction. For example, the at least two different faces may be the front side and rear side of an at least partly transparent object, such as the surface points of an organelle within a cell, or the outer border of the cell itself, for example. With particular preference, each of the at least two different faces is coherent and therefore constant and amenable to differentiation, as may typically be assumed for self-contained cell constituents. Alternatively, the different faces may also be two parallel planes for which the object information is determined. In technical implementations of the determination of the three-dimensional information using microscopic systems, for example, the faces may preferably be normal to the Z-direction. In that case the faces are preferably planar faces. If the object, for example, is a cell, then the depth information in the image in the region of the cell nucleus might contain four pieces of depth information, with for example the following sequence, with rear side of the cell, rear side of the cell nucleus, front side of the cell nucleus, and front side of the cell. In the case of more complex structures in the at least partly transparent object, it is also possible for more than four, and indeed significantly more than four, pieces of depth information to be present for one image point, if more than two structural elements of the object are present in the direction of measurement, with their delimitations being amenable to contrast with the optical techniques selected.

In this context, 2.5-dimensional information is understood to comprehend topographical information, in the form, for example, of a height and/or optical thickness. One example of 2.5-dimensional information might be, for example, a contour image, which in the z-direction produces the topography of the surface of the object or alternatively the profile of the optical thickness of the object. Structures, structural regions, or delimitable structural units lying deeper within the object, of the kind present, for example, in cells with nucleus and cytoplasm, or the information concerning the position and/or shape or topography of the rear side of the object, cannot be resolved and presented in the context of the height information in the 2.5-dimensional image. In the case of the optical thickness, the respective optical path length occurring on a summary basis on a light path through the object is presented as the optical thickness. For example, in the case of an interferometer with a Mach-Zehnder or Michelson construction, the summation of the optical thickness is determined by comparing the optical path lengths of reference beam path and object beam path with an interferogram, allowing the optical thickness for each adjacent pixel to be determined from the interference structures that occur, in accordance with the lateral resolution of the detector. The 2.5-dimensional information differs from the three-dimensional information in that for each image point there is exactly one piece of depth information, describing the topography of the object or the optical thickness and reproducing, for example, the topography of the object in the manner of a relief image.

Two-dimensional information in this context refers, for example, to image information which images an object region in a planar image with the lateral coordinates in the X- and Y-directions that describe and span the area. The individual image points of a two-dimensional image are also referred to as pixels and, besides the information concerning brightness and/or color and/or polarization, contain no further information about mechanical height or optical thickness of the object.

For an unambiguous interpretation of the image data with three-dimensional information, it is generally necessary to know the coordinate system—for example, Cartesian or cylindrical—and the orientation of the coordinate axes that have been used for defining the underlying coordinate system.

In further advantageous configurations, the three-dimensional information is information concerning intracellular structures, such as cell organelles and/or geometric structures of a tissue section, for example. Information concerning optical path lengths generally does not readily correspond to geometric information, and in this respect, therefore, optical path lengths are not geometric information.

The staining protocol is preferably the May-Grünwald-Giemsa staining protocol, modified Wright staining, Wright-Giemsa staining, and/or Romanowsky staining and/or comprises a predetermined color table which preferably does not correspond to any chemical staining protocol.

A color distribution according to one of the above-stated staining protocols is preferably applied in the digital staining of the cell. For this, preferably, images of the technical contrast are recolored from black/white and/or according to extended contrasting methods by means of staining properties determined by computer learning. This is preferably done using 3D and/or volumetric information, as this is advantageous in relation to the use of pure 2D color mapping.

The staining protocol is advantageously an artificial color model which, for example, emphasizes certain critical features in order to make it easier for physicians to make findings or even to enable diagnosis for inexperienced physicians, for instance. This artificial color model can be configured in a manner similar to a false color representation for technical images, similarly to thermal images or IR images, for example, which are represented as a color image. Hence even within the findings for one and the same cell, the staining models can be simply switched, something which would not be possible in the case of conventional chemical staining.

Cells assigned to different classes preferably undergo different digital staining. All of the cells in the image which are not to be considered at the current time are advantageously masked out. Alternatively, preferably, only a selected quantity of different cell groups is presented.

The 3D information about the cells, optionally also in combination with the extended contrasting techniques such as phase contrast or DIC, are preferably utilized in order to replace the omitted color information of the inapplicable direct staining with the 3D information. This makes it possible for the correspondingly learned information relating to the unstained image to be converted into the color information as robustly as possible and with less susceptibility to error.

A further subject of the invention is a method for training a method of the invention for digitally staining a cell and/or medical preparation, the method comprising the steps of:

aa) ascertaining three-dimensional information about a cell and/or medical preparation by means of a first analyzer for analyzing a medical sample, the analyzer comprising an apparatus for ascertaining the three-dimensional information about the cell and/or medical preparation, bb) coloring the cell and/or medical preparation by implementing a staining protocol, cc) ascertaining three-dimensional information about the cell and/or medical preparation by means of a second analyzer for analyzing a medical sample, the analyzer comprising an apparatus for ascertaining the three-dimensional information about the cell and/or medical preparation comprising a color contrast, where the color contrast is sensitive to the coloration of the staining protocol, and dd) compiling and storing an assignment between the three-dimensional information about the cell and/or medical preparation ascertained in step aa) and step cc).

The predetermined assignment between the three-dimensional information pertaining to the cell and the staining of a corresponding cell and/or of a structure within the cell by means of a staining protocol is preferably ascertained in a learning phase for example as follows.

For this purpose, the cell or cells are first of all imaged in a first image without staining. The cells are then stained in accordance with the respectively desired staining protocol. The stained cell or cells are subsequently imaged in a second image. The cell is (or the cells are) then recognized in the first and second images and segmented, and the unstained and stained cells are respectively assigned accordingly.

The cells are advantageously grouped according to cell type—for example, red blood cells (RBC), white blood cells (WBC) (optionally including 5 part diff.), and/or classified, by means of computer learning and/or neural networks, for example.

The next step is that of the computer learning of the characteristics of the staining for each of the cell groupings separately from one another, after which a specific digital staining specification is created for the unstained cells, advantageously in a separate manner for each cell grouping.

For verification of the digital staining specification, the staining is then applied to the unstained cells and a comparison is made including an evaluation of the result of the digital staining with the sample actually stained, the aim being for the stained and digitally stained cells to have as identical an appearance as possible. An evaluation of the result then takes place advantageously in accordance with predetermined quality criteria and/or according to maximum permitted residual deviations. Owing to the issue of color fidelity, which is always very critical within medicine, the color deviations may also be evaluated against an external reference standard, as is described for example in DICOM for displays and display devices. Since the standard has not been written for this specific application, the evaluations may possibly be transferred and applied only in an analogous way. The staining model is accordingly created, checked, and stored individually or in targeted fashion for each staining protocol and each cell grouping.

Step cc) preferably comprises segmenting the ascertained three-dimensional information comprising the color contrast for recognizing cellular and/or subcellular structures in the sample.

The creation of the assignment in step dd) preferably comprises application of techniques of machine learning and/or artificial intelligence (AI) by means of a computer. This has the advantage that in this way the color presentation can be optimized further.

In order to optimize the color presentation, therefore, the staining can advantageously also be determined using techniques of machine learning and/or of artificial intelligence (AI). For example, the procedure set out below may be used advantageously in this regard. To train a computer system for this purpose, for example, samples are applied in the hitherto customary manner to an object carrier. Then first of all the still unstained sample is measured with the optical system with technical contrast, and the image data is stored. It is advantageous here if the image data also maintain the lateral locational information of the sample or the lateral assignment of part-images is retained when larger sample regions are being captured. Subsequently the sample is stained in accordance, for example, with one of the known, typical staining protocols. Thereafter the sample is captured optically again. This time it is captured more particularly as a color image, in order to describe the coloration for each sample region with a color value and/or a group of color values (e.g., RGB). The color image or multiplicity of part-images of the sample then serve as a reference for the staining of respective cell regions or cell structures with the respective coloration. To complement this, the sample may advantageously also be captured using different technical contrasts, in order for example to enable more effective recognition or contrasting of transitions in the cell structures than would be possible with the staining alone. A computer system configured for learning is then fed with the data records for unstained sample and stained sample with a multiplicity of part-images and/or a multiplicity of samples. The system here is to learn corresponding cell regions and/or image structures, particularly the appearance of the technical contrast and/or the image structure in the technical contrast and in the color contrast of the respective coloration. In this case it is advantageous if the spatial assignment of image points or image regions from the images with technical contrast and the color images are known. For this, the knowledge of the at least lateral image coordinates is a great advantage and facilitates the assignment, since it is necessary only to determine a displacement and/or optionally rotation of the images (e.g., part-images and/or overall images put together by stitching). Such assignments may be determined, for example, with correlations of the images and/or of image regions.

An alternative possibility is to compile and use an "artificial" color table which is advantageously optimized, for example, such that different constituents of cell and/or tissue are presented with maximum color contrast or then similar colors or hues are used for cell structures which are characteristic of a cell development line. Here, then, advantageously, one particular kind of cell structure or cell is assigned a color value, and the color saturation is then selected correspondingly by way, for example, of the thickness of the respective cell structure.

The first and second analyzers preferably comprise the same instrument.

A further subject of the present invention is a method of the invention for digitally staining a cell and/or medical preparation, where the assigning in step b) has been determined by means of a method of the invention for training a method for digitally staining a cell and/or medical preparation.

The method for training a method for digitally staining a cell and/or medical preparation preferably further comprises in step a) the above-recited steps of a method for ascertaining three-dimensional information pertaining to a cell by means of an analyzer in accordance with an advantageous method of the invention for digitally staining a cell and/or medical preparation.

The procedure for digitally staining a cell is preferably, for example, as follows. First of all, the desired staining protocol is selected and the unstained cells are imaged in a first image. The cell or cells are segmented in the first image. The cells are then assigned to cell groupings and/or the cell type is determined for the selection of a cell-specific staining model. In the next step the cell or cells are stained. Subsequently a digitally stained image, of a blood smear, for example, is displayed on an output unit.

Advantageously, the same unstained image is stained in the appropriate staining that is conventional in the respective geographical region. This enables common findings to be made for a sample by experts who are used to forms of staining that are different from one another.

It is also possible for the respective staining protocol to be interchanged at any time, irrespective of whether the original blood sample is still present, for the purpose, for example, of producing further blood smears. Another great advantage of the digital restaining is that one and the same cell can be stained differently, something which is not possible in the case of chemical staining of the actual cell. This also enables, for example, consultation across different geographical regions, beyond existing boundaries of staining protocol applications. On account of the information present entirely digitally, existing problem areas, such as fading of the sample over time, for example, are done away with.

Since an image with a technical contrast can therefore be stained advantageously with different color tables, it is also possible for doctors from different geographical regions, in which different staining protocols are employed, to carry out findings on one and the same sample. Through the use of generic or artificial color tables it is additionally also possible to obtain image presentations with richer contrast, which would not be possible in this way via staining.

A further facility provided is that in the case of any retrospective investigations on specific patients, staining protocols can be applied that were unknown or unavailable at the point in time of the original findings. This makes it possible for medical progress in relation to the standard of care to be applicable even to existing samples or the images thereof, and is able to lead to correspondingly higher-quality findings.

Previously the blood smears were stained in a laborious upstream step in order to render the cells in the blood smear sufficiently visible for the microscope and for observation by the physician, to allow the cells to be analyzed using high-resolution optical microscopy. For many decades this technique has been customary and established. On a worldwide basis there are a variety of staining protocols established in this regard, such as May-Grünwald-Giemsa, modified Wright stain, Wright-Giemsa stain and Romanowsky stain, for example, and even within the protocols there may be laboratory-specific differences, since certain laboratories adapt the staining slightly according to their wishes. As a result of this, there is only limited possibility for comparability in the analysis of blood smears, especially since in automated analysis and classification of blood smears it is only possible to make effective comparisons of cells with one another if they have been stained according to the same protocol. A further disadvantage of the existing procedure is that the stain requires an exposure time on the smeared blood sample of about 10-15 minutes. In the case of analyses relating to acute clinical pictures, this may be very disadvantageous.

As far as possible, preferably, supplying stain to sample for the purpose of staining the cell ought to be avoided, at least before the sample has been imaged once.

Preferably, in accordance with the invention, with the new digital staining it is also possible to select different staining protocols for different types of cell, on the basis, for example, that the specifics of the protocols are a particularly good fit with the respective cell type. Hence it would be possible for a physician or hematologist or pathologist to draw up personal staining schemes, in which they assign a particular staining to one cell type, with the existing restriction to only one stain for one slide being completely broken and eliminated. In an extension to this "individual" staining, it is also possible advantageously for generic digital staining protocols to come about, which additionally utilize the technical color space for improved recognizability of features and structures. Chemical staining operates substantially, in each staining step typically, by way of one stain which attaches in different quantities to appropriate binding-capable cell structures. The greater the attachment of stain, the greater the extent to which light from the spectrum of the illuminating light is absorbed in accordance with the absorption spectrum of the stain in question. The transition image therefore contains a higher color saturation (S) for the color value(s) of the stain (V). Where two or more stains are applied simultaneously or serially within a staining protocol, and bind to different sites on the cell structure, the effects are superimposed on one another. Each stain then modifies the saturation value S for its specific color value V according to the amount of stain attached. The number of color values V modified is limited via the number of stains and their specific spectral characteristics. Typical colorations in medicine are situated in the red-blue range, and so, for example, color values in the green or yellow spectral range remain virtually unchanged. The digital staining may advantageously operate not only with sharper color separation but also with broader coverage in the optical spectrum.

With certain investigations, however, it may be advantageous not to dispense entirely with the addition of stains and/or pharmaceutical and/or chemical adjuvants. In the case of reticulocytes, for example, the stain, in addition to the pure color effect, has the desired side effect that the RNA still available in the cell is caused to cohere, with only this making it imageable and contrastable in the microscope. The non-cohered RNA is smaller in terms of dimension than conventional optical microscopes would be able to resolve.

Advantageous configurations of the method of the invention are based on an optical microscope which is equipped advantageously for image recording with extended optical contrasting techniques. These extended contrasting techniques may comprise, for example, phase contrast (PC), differential interference contrast (DIC), polarization contrast (POL), interferometry (preferably in the form of a digital holographic microscope (DHM)), hyperspectral imaging (pure color contrast in an extended spectral range, e.g., UV, VIS, NIR, MIR and/or FIR or selected subregions thereof), and/or structured illumination (e.g., with predetermined intensity distributions and/or phase distributions, preferably set in the pupil plane).

Different contrasting techniques are preferably present in parallel on a microscopy system, especially if they can be utilized for example without interaction among one another. Otherwise, the different contrasting techniques are preferably performed successively in terms of time. Where the different contrasting techniques are performed successively in terms of time, it is preferred in the invention if a particle image velocimetry (PIV) is provided in order to track the respective trajectories, since the cells move between the images in the case of combination with a microfluidic system. This makes it possible for the color information obtained in the different modalities to be brought together again correctly for each cell. PIV preferably also comprises the rotation of the cell, and, advantageously, the defocusing as well.

By way of the extended contrasting techniques, the samples are provided, for example, with a color contrast from interferences, for example DIC or polarization, which subsequently in the digital image ensures effective resolution of the structures in the cell and/or facilitates effective contrasting for the cell.

It is particularly advantageous in the invention if in addition to the amplitude information or intensity information and possibly also color information, there is 3D information as well. The images of the light field camera for 3D recording may also take the form of volumetric and/or tomographic data. This 3D information makes it possible in accordance with the invention to carry out retrospective, purely digital through-focusing on the recorded image. This is particularly advantageous for the verification of the automatic classification by the physician and for the specific and reliable assessment of pathological or conspicuous cells in this context.

In accordance with the invention, in digital staining new staining modes are then preferably provided as well, where the currently displayed staining is dependent only on the region of the cell which is located, for example, below the focal plane. In this way the 3D perception of depth by the physician can be further improved. Alternatively, it is also possible for only regions above the current focal plane to be used, or else regions within a certain adjustable layer thickness around the specific focal plane.

For the digital staining of the invention, therefore, an image recorded microscopically with an analyzer is then post-processed in such a way that it looks as it probably would have looked had it been recorded with a conventional microscope on stained cells. For implementation, for each staining protocol, a certain number of unstained samples with a multiplicity of cells are recorded in the new system. The cells may be recognized for the comparison, manually or else automatically, in the image and segmented. Thereafter the same samples are stained with the desired staining protocol and then the same cells are recorded again using a microscope. It is important here for the microscope to possess good color fidelity and a color camera, more preferably a color camera that is optimized for best-possible true-color image recording, the camera optionally also having been calibrated with specific samples or calibration procedures, in accordance with the DICOM standard in medicine, for example.

Typical color cameras have a Bayer pattern, in which 50 percent of the pixels are sensitive predominantly to green, 25 percent of the pixels are sensitive predominantly to blue, and the remaining 25 percent of the pixels are sensitive predominantly to red. To obtain complete color information in respect of the RGB values for each pixel, the color values of the adjacent pixels of the corresponding color are interpolated for the color value to be determined, for example. For this purpose, optionally, continuity information from the pixels of other color values is also considered and employed. Preferred color cameras are, for example, three-chip color cameras, which directly measure an intensity value for red, green, and blue in parallel for each image point. These preferred color cameras, accordingly, are to be cameras which measure the required color values directly for each pixel.

Since the information obtained from unstained cell and stained cell is then present for each cell, the color information can be linked between the two samples, preferably via techniques of computer learning, for example. This linkage takes place preferably separately for each class of cells, in order for specific staining characteristics to be captured as well as possible. Alternatively, it is advantageous, in order to simplify the complexity and scope of learning, to implement joint learning of identical cell types which are present for example at different development stages. This might take place advantageously in the case, for example, of red blood cells which are present in different states of ageing, where there are slight changes in their geometric shape. Similarly, it is possible advantageously in the case of white blood cells to carry out joint training of the five main groups, which are distinguished in the five-part differential diagnostics. It may then be advantageous to learn the stains of specific features within such a group in a second step, in order to obtain color contrasting which is as comprehensive and effective as possible.

In the context of the learning, the 3D information, is processed with particular preference in the form, for example, of topographical information or as volumetric and/or tomographic information. For the learning, this 3D information and, advantageously, information derived from it, such as an effective 3D profile, for example, may be used both for the unstained image and, preferably, for the stained image. In that case, all methods known from computer learning are applicable in principle for the learning, such as, for example, PLS, PLSDA, PCA or else neural networks (CNN) or deep CNNs.

For an effective learning outcome and in order for digital staining to be achievable that is as realistic as possible, it is advantageous if the classification per cell type to be learned and/or per group of jointly learned cells is implemented in at least as many color values as can be distinguished in the original sample and/or as can be presented on the display facility. In the case of computers, color spaces are commonplace for color representation, where for example 256 color values, i.e., 8 bit or 1 byte color depth, or 65536 color values, i.e., 16 bit or 2 byte or 1 double byte, are used per color for each image point.

In order to save efficiently on data volume, it may be advantageous to select a different presentation of the color space and/or of the color values than RGB. Because the effective color values may differ between the cell types and, in an idealized manner, may differ only in saturation and/or brightness within one cell type, a color value and a brightness value are advantageously stored. This has the advantage that it is not necessary to store the complete color information in RGB for each image point. This advantageous representation would be comparable, for example, with an HSV or HSL color representation. On account of the frequently comparatively similar colors in the images, the potential for saving on storage space and/or data volume here is particularly high.

A great advantage of the digital staining of the invention is that samples can now also be compared between geographical regions which typically operate with different staining protocols and hence different color effect of the cells. If an unstained sample to be investigated has been recorded, it may be stained in accordance with the invention selectively with different learned color structures which correspond to the respective regional staining protocol. One advantage this offers is that for different pathologies it is now possible to use the preferred or advantageous staining protocol. Moreover, this also allows one physician to consult another physician for their opinion, since the first physician can now show the second physician the image with the staining the latter is accustomed to. The digital staining allows the hurdles erected by the staining protocols to be circumvented, since now each physician is able to select the staining they are used to in order to carry out the findings. For example, physicians from Europe and the USA are then also able to cooperate more effectively, to the benefit of the patient. This therefore facilitates worldwide cooperation between physicians and/or hematologists in the sense of telemedicine.

For telemedicine, therefore, or by way of telemedicine, each physician is able worldwide to contribute to verified findings using the data records and/or 3D images digitally stained appropriately. Hence it is possible, via a database, for example, particularly for rare pathological cases, for a reliably evaluated "ground truth" data record to be formed via the worldwide linkage afforded by the telemedicine, advantageously, in relation to observed and/or measured cells, this data record consisting of a combination of image and/or 3D information and the findings verified by at least two physicians. An important building block for this approach lies also in the possibility, according to the invention, of being able to modify the images in focus in an adapted way and separately for each cell recorded in the digital data record, without the physician making the findings being themselves seated at a microscope.

This data record made up of findings made independently by multiple physicians may then be used, subject to the findings being consistent, for the further training of computer models, for example, which may then be played back again on the devices installed worldwide, in order thus for each device to be developed further in terms of quality of recognition for certain cells or in terms of the capacity to be able to automatically recognize particular pathologies in a reliable way.

In further advantageous configurations of the method of the invention, it may also be advantageous for analyzers to record images and then transfer them, for example, into a cloud-based application or, more generally, to a different computing unit, where the cells are then recognized, segmented and subjected to automated evaluation, in the sense, for example, of an assignment to a class of cell type or to findings as a recognition of particular clinical pictures and/or the determination of a suspected particular clinical picture.

For the physician there are a variety of options for displaying the image data recorded in respect of a cell.

Use may be made advantageously, for example, of a conventional 2D monitor, a mobile terminal, and/or a tablet PC. The color representation is advantageously balanced in such a way that the physician is able to assume a true-color color reproduction. This is particularly important in hematology, since, especially in the case of pathological or conspicuous cells, small differences in color and in structure in the image of the cell may provide an indication of an abnormality. The color reproduction, particularly in terms of stable color reproduction, advantageously meets for example the DICOM standard for medical devices (dicom.nema.org/).

Advantageously the user and/or operator may then operate software in order to focus through the cell images and/or the planar image of the object carrier or of the flow cell. For this purpose, advantageously there is a correspondingly secure data link, or a data link meeting any specifications, to the data on a local data memory, a superordinate data memory, in a hospital, for example, and/or a cloud. The data may preferably be made directly accessible to a physician for the purpose, for example, of a consultative examination.

A 3D-capable display is preferably used, which can be viewed either with or, more preferably, without further optical assistants and which generates a 3D visual impression for the user. The 3D-capable display is preferably part of a computer and/or a mobile terminal, such as a tablet, for example. The 3D effect here can preferably be activated and deactivated.

Data goggles, also referred to as smart glasses or VR glasses, are preferably used for the 3D representation of the data record.

For remote findings in telemedicine, the invention preferably provides a master-slave work mode if, when the images are diagnosed at the same time by a plurality of physicians, at a medical conference, for example, one of the physicians, as the master, leads the navigation via the images of the cells and/or of the object carrier and/or of the flow cell, and the other physicians are then able to follow the master without having independent control of the system.

With preference each of the physicians is also able to focus through their image independently of the others and/or to stain the image according to their accustomed staining protocol.

A further subject of the invention is a digital system for compiling and/or presenting images of cells and/or tissue, comprising one or more of the methods of the invention.

Subjects of the invention are elucidated in more detail below once again by means of specific exemplary embodiments and an appended drawing. The examples each represent preferred embodiments of the invention.

An advantageous procedure for the retraining of a method of the invention for digitally staining a cell and/or medical preparation encompasses, for example, the steps set out hereinafter. First of all, a 3D image of the sample is recorded with technical contrast. Advantageously, in addition a 2D image of the sample is also recorded with technical contrast. The sample is then stained according to a staining protocol. Subsequently again, a 3D image of the sample is recorded with color contrast. Advantageously, in addition a 2D image of the sample is also recorded with color contrast. Following an optional but advantageous implementation of the segmentation of the image for the purpose of recognizing cells and/or cell regions in the image of the sample, or else of recognizing subcellular structures, an assignment is carried out between technical contrast and color contrast for different regions of the cell and/or sample, by means of computer learning.

An advantageous procedure for digitally staining a cell and/or medical preparation encompasses, for example, the steps set out hereinafter. First of all, a 3D image of the sample is recorded with technical contrast. Advantageously, in addition a 2D image of the sample is also recorded with technical contrast. The image of the sample is then analyzed and/or segmented for the recognition of cells and/or cell regions in the image of the sample and/or else of subcellular structures. Additionally, the image of the sample is digitally stained on the basis of the existing information regarding the 3D structure of the cell or cell region and/or of the subcellular structures, based on a predetermined color table for the various structures in the cell and/or of cells. The color table is, for example, an artificial color table and/or a learned color table. In addition, a colored image is output for an observer and/or for storage of the digitally stained image in a database. In addition, advantageously, the image or images relating to a sample, for example, from a patient, or of a tissue region of a patient, are diagnosed for all cells or tissue regions or cell regions of interest, on the basis of the stained images. Additionally, an overall finding is drawn up for the patient, advantageously.

The 3D and/or 2D images of the sample here are recorded for example by means of an automated analyzer for analyzing a medical sample, which in particular also enables the analysis of cells in the sample.

BRIEF DESCRIPTION OF THE DRAWING

The analyzer of the invention is elucidated in more detail by means of a specific exemplary embodiment, on the basis of the appended drawing. The example shown represents one preferred embodiment of the invention. In the drawing:

FIG. 1 shows an automated analyzer for analyzing cells in a sample.

DETAILED DESCRIPTION OF THE INVENTION

The automated analyzer shown in FIG. 1, for analyzing cells in a sample, comprises an optical microscope (1) comprising a light source (4) for illuminating a sample (2) and a converging lens for converging and focusing light beams (6) which emanate from the illuminated sample (2). The sample (2) is a blood sample containing blood cells (3). The sample (2) is located in a microfluidic flow cell (10). The microscope (1) further comprises a light field camera (8) comprising a digital recording device, the recording device comprising a CCD chip or a CMOS chip, for recording the light field imaged in the microscope (1). The microscope (1) further comprises an additional camera for recording an image in the object plane, this camera being embodied as a high-resolution three-chip color camera (9). The lateral resolution of the color camera (9) is four times the effective lateral resolution of the light field camera (8). The focus of the color camera (9) is set on a central region of the measuring range of the light field camera (8), e.g., to a virtual depth in the range from 3 to 5. The incoherent illumination sigma on the microscope (1) is 1.0. The microscope (1) is a microscope which may also be operated as a differential interference contrast (DIC) microscope (1).

LIST OF REFERENCE SYMBOLS

1 Microscope
2 Sample
3 Blood cell
4 Light source
6 Light beams
8 Light field camera
9 Color camera
10 Flow cell

The invention claimed is:

1. A method for digitally staining a cell or medical preparation, the method comprising the steps of:
   a) ascertaining three-dimensional information about a cell or medical preparation using an analyzer for analyzing a medical sample, the analyzer comprising an apparatus for ascertaining the three-dimensional information about the cell or medical preparation,
   b) digitally staining the cell or medical preparation in accordance with a predetermined assignment between the three-dimensional information about the cell or medical preparation and the staining of a corresponding cell or medical preparation or cellular or subcellular structures of the cell or medical preparation using a staining protocol, wherein the staining protocol is a predetermined color table which does not correspond to a chemical staining protocol, and
   c) representing the digitally stained cell or preparation, where the representation takes place with a predetermined defocus range, and where regions of the cell or preparation with different digital staining in the region of the defocus range are represented as corresponding modulations of color intensities or as mixed color, the representing including storing only one color value and one intensity value for each image point.

2. The method as claimed in claim 1, wherein the representing in step c) further comprises a displaying of a two-dimensional image of the digitally stained cell or preparation, where the displaying of the two-dimensional image corresponds to the image in a selected focal plane of the cell or preparation and where mutually superposed regions of the cell or preparation with different digital staining in the region of the defocus range are displayed as corresponding modulations of color intensities or as mixed color.

3. The method as claimed in claim 1, wherein the three-dimensional information ascertained in step a) comprises information about the sample at cellular or subcellular orders of magnitude.

4. The method as claimed in claim 3, wherein step a) comprises segmentation of the ascertained three-dimensional information for recognition of cellular or subcellular structures of the sample.

5. The method as claimed in claim 1, wherein the three-dimensional information ascertained in step a) is three-dimensional image information.

6. The method as claimed in claim 1, wherein the three-dimensional information ascertained in step a) comprises holographic information.

7. The method as claimed in claim 1, wherein the analyzer for ascertaining the three-dimensional information in step a) comprises an optical microscope for imaging a light field in an object region for imaging the sample, the microscope comprising a light source for illuminating the sample and an objective comprising a converging lens for converging and focusing light beams emanating from the illuminated sample, and a digital recording device for recording the light beams, where a light field camera for recording the light field from the object region that is imaged in the microscope is provided on the microscope, where the light field camera comprises the digital recording device.

8. The method as claimed in claim 7, wherein the light field camera comprises a microlens array with lenses of different focal lengths, where the microlens array is able to image an intermediate image of the light field imaged in the microscope onto the digital recording device.

9. The method as claimed in claim 7, wherein the microscope is an amplitude contrast microscope or a phase contrast microscope or a differential interference contrast (DIC) microscope.

10. The method as claimed in claim 7, wherein a further camera for recording an image in an object plane in the object region is provided on the microscope, where the further camera has a lateral resolution which is higher than the lateral resolution of the light field camera and where the further camera has a larger field of view than the light field camera.

11. The method as claimed in claim 10, wherein the further camera is a color camera.

12. The method as claimed in claim 7, wherein an incoherent illumination sigma on the microscope is greater than 0.8, where sigma is given as the ratio of the numerical aperture of the illumination of the sample to the numerical aperture of the objective, and where the microscope is a differential interference contrast (DIC) microscope.

13. The method as claimed in claim 1, wherein the analyzer is an automated hematology analyzer, and where the cell is a blood cell.

14. The method as claimed in claim 1, wherein the sample in step a) is supplied to the analyzer via a flow cell and where the object plane of the microscope lies in the flow cell, or wherein the sample in step a) is supplied to the analyzer on an object carrier via a sample supply facility for object carriers.

15. The method as claimed in claim 1, wherein the cells or medical preparations are not stained.

16. The method as claimed in claim 1, further comprising the step of:

d) assigning the cell to a cell type on the basis of predetermined information and the three-dimensional information about the cell ascertained in step a).

17. The method for digitally staining a cell or medical preparation as claimed in claim 1, wherein the assignment in step b) has been determined by a method for training a method for digital staining of a cell or medical preparation comprising:

aa) ascertaining three-dimensional information about a cell or medical preparation using a first analyzer for analyzing a medical sample, the first analyzer comprising an apparatus for ascertaining the three-dimensional information about the cell or medical preparation, bb) coloring the cell or medical preparation by implementing a staining protocol, cc) ascertaining three-dimensional information about the cell or medical preparation using a second analyzer for analyzing a medical sample, the second analyzer comprising an apparatus for ascertaining the three-dimensional information about the cell or medical preparation comprising a color contrast, where the color contrast is sensitive to the coloration of the staining protocol, and dd) compiling and storing an assignment between the three-dimensional information about the cell or medical preparation ascertained in step aa) and step cc).

18. A method for training a method for digitally staining a cell or medical preparation, the method comprising the steps of:

aa) ascertaining three-dimensional information about a cell or medical preparation using a first analyzer for analyzing a medical sample, the first analyzer comprising an apparatus for ascertaining the three-dimensional information about the cell or medical preparation, bb) coloring the cell or medical preparation by implementing a staining protocol, cc) ascertaining three-dimensional information about the cell or medical preparation using a second analyzer for analyzing a medical sample, the second analyzer comprising an apparatus for ascertaining the three-dimensional information about the cell or medical preparation comprising a color contrast, where the color contrast is sensitive to the coloration of the staining protocol, the apparatus including a light field camera and a color camera both aligned to record images related to the cell or medical preparation, the color camera having a lateral resolution four times higher than a lateral resolution of the light field camera, and the color camera having a resolution at least twice that of the light field camera, wherein the light field camera and the color camera record synchronously, and dd) compiling and storing an assignment between the three-dimensional information about the cell or medical preparation ascertained in step aa) and step cc).

19. The method as claimed in claim 18, wherein step cc) comprises segmentation of the ascertained three-dimensional information comprising the color contrast for recognizing cellular or subcellular structures of the sample.

20. The method as claimed in claim 18, wherein the compiling of the assignment in step dd) comprises applying techniques of machine learning or artificial intelligence using a computer.

21. The method as claimed in claim 18, wherein the first and second analyzers are the same device.

* * * * *